(12) United States Patent
Sato

(10) Patent No.: US 11,370,430 B2
(45) Date of Patent: Jun. 28, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 131 days.

(21) Appl. No.: 16/783,990

(22) Filed: Feb. 6, 2020

(65) Prior Publication Data

US 2020/0255011 A1   Aug. 13, 2020

(30) Foreign Application Priority Data

Feb. 8, 2019 (JP) .............................. JP2019-021770

(51) Int. Cl.
  *B60W 30/16*  (2020.01)
  *B60W 30/12*  (2020.01)
  *B60W 50/14*  (2020.01)

(52) U.S. Cl.
  CPC ............ *B60W 30/16* (2013.01); *B60W 30/12* (2013.01); *B60W 50/14* (2013.01);
  (Continued)

(58) Field of Classification Search
  CPC ...... B60W 30/16; B60W 30/12; B60W 50/14; B60W 2540/215; B60W 2540/223; B60W 2540/12; B60W 2540/18; B60W 2552/223
  See application file for complete search history.

(56) References Cited

U.S. PATENT DOCUMENTS

| 8,577,553 B2 | 11/2013 | Nitta et al. |
| 9,637,107 B2 | 5/2017 | Matsuno et al. |

(Continued)

FOREIGN PATENT DOCUMENTS

| CN | 102421645 | 6/2015 |
| DE | 102016009709 | 2/2017 |

(Continued)

OTHER PUBLICATIONS

Preliminary Search Report and Written Opinion dated Mar. 17, 2021 issued in French Patent Application No. 2000616.

(Continued)

*Primary Examiner* — Peter D Nolan
*Assistant Examiner* — Wae L Louie
(74) *Attorney, Agent, or Firm* — Cozen O'Connor

(57) ABSTRACT

An ACC function for performing constant speed cruise according to a target speed when there is no preceding other vehicle in a vehicle's driving lane and performing following cruise by maintaining a predetermined inter-vehicle distance when there is a preceding other vehicle, an LKA function for maintaining cruise, an override function for stopping the ACC function and the LKA function by a driver's operation intervention, and a fallback function for performing fallback control of the ACC function and/or the LKA function, with notifying the driver of stopping the ACC function and/or the LKA function and operation takeover, at a time of system operational design domain deviation of the ACC function and/or the LKA function, override threshold values of the functions serving as a determination criterion of the operation intervention for stopping the ACC function and/or the LKA function at the time of system operational design domain deviation are configured to be altered to a value greater than during normal operation when the functions are within a system operational design domain.

6 Claims, 7 Drawing Sheets

(52) U.S. Cl.
CPC . *B60W 2510/1005* (2013.01); *B60W 2540/10* (2013.01); *B60W 2540/12* (2013.01); *B60W 2540/18* (2013.01); *B60W 2540/215* (2020.02); *B60W 2540/223* (2020.02); *B60W 2552/00* (2020.02)

(56) References Cited

U.S. PATENT DOCUMENTS

| | | | |
|---|---|---|---|
| 9,665,779 B2 | 5/2017 | Ooi | |
| 9,809,164 B2 | 11/2017 | Matsuno et al. | |
| 10,001,781 B2 * | 6/2018 | Nakamura | B60W 30/12 |
| 10,589,786 B2 * | 3/2020 | Fujii | B60W 30/09 |
| 10,704,301 B2 * | 7/2020 | Kim | E05B 81/64 |
| 10,839,689 B2 * | 11/2020 | Mizoguchi | B60W 50/10 |
| 2005/0216172 A1 * | 9/2005 | Schroder | G08G 1/166 701/96 |
| 2012/0065861 A1 | 3/2012 | Hartmann et al. | |
| 2017/0018189 A1 | 1/2017 | Ishikawa | |
| 2017/0297567 A1 | 10/2017 | Matsumura | |
| 2017/0341647 A1 * | 11/2017 | Rajvanshi | B60W 30/12 |
| 2017/0355368 A1 * | 12/2017 | O'Dea | B60W 30/18163 |
| 2018/0194364 A1 | 7/2018 | Asakura et al. | |
| 2018/0370542 A1 | 12/2018 | Braunagel et al. | |
| 2019/0071099 A1 | 3/2019 | Nishiguchi | |
| 2019/0106108 A1 * | 4/2019 | Wienecke | B60R 11/04 |
| 2019/0227546 A1 | 7/2019 | Sato | |
| 2019/0322289 A1 * | 10/2019 | Adachi | F16H 61/0213 |
| 2019/0382009 A1 | 12/2019 | Iwasa | |

FOREIGN PATENT DOCUMENTS

| | | |
|---|---|---|
| EP | 2979914 A2 | 2/2016 |
| JP | 2006-111170 | 4/2006 |
| JP | 2007-216775 | 8/2007 |
| JP | 2009-149255 | 7/2009 |
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2019-051894 | 4/2019 |
| JP | 2019-127136 | 8/2019 |
| WO | WO 2008/004963 | 1/2008 |
| WO | WO 2009/086857 | 7/2009 |

OTHER PUBLICATIONS

Office Action dated Jul. 2, 2021 issued in India Patent Application No. 202014005148.

Office Action dated Oct. 7, 2021 issued in related U.S. Appl. No. 16/597,540.

Notice of Allowance dated Apr. 4, 2022 issued in U.S. Appl. No. 17/030,339.

* cited by examiner

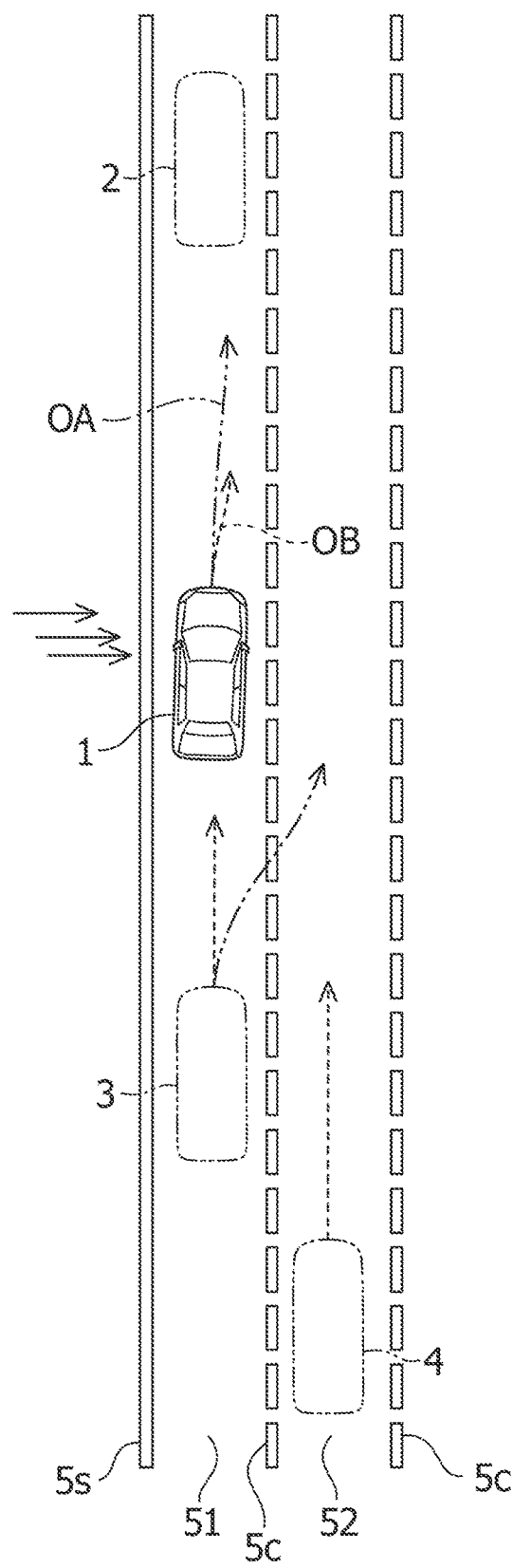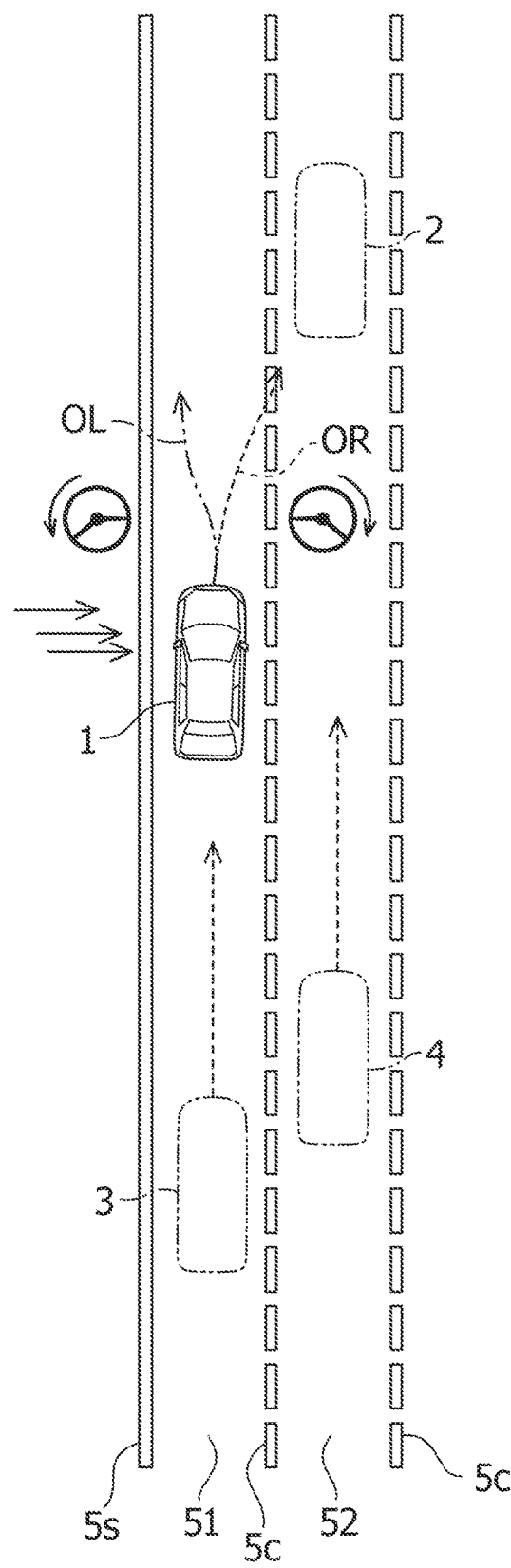

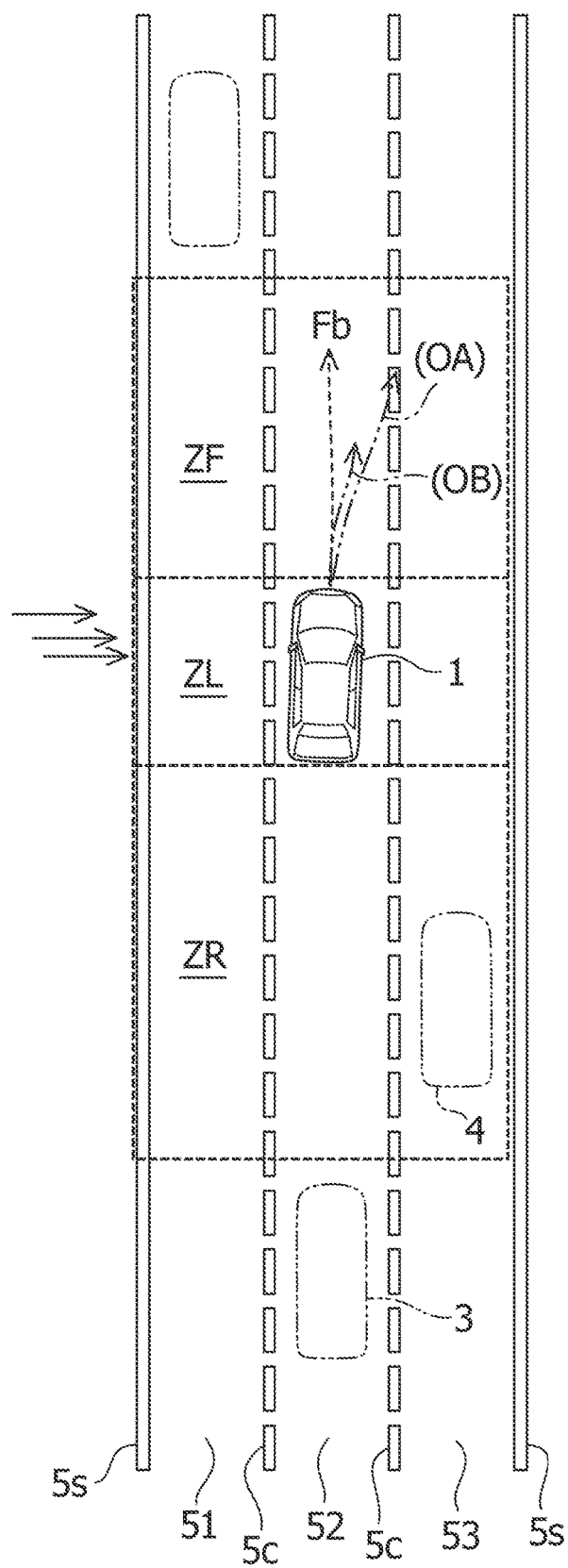
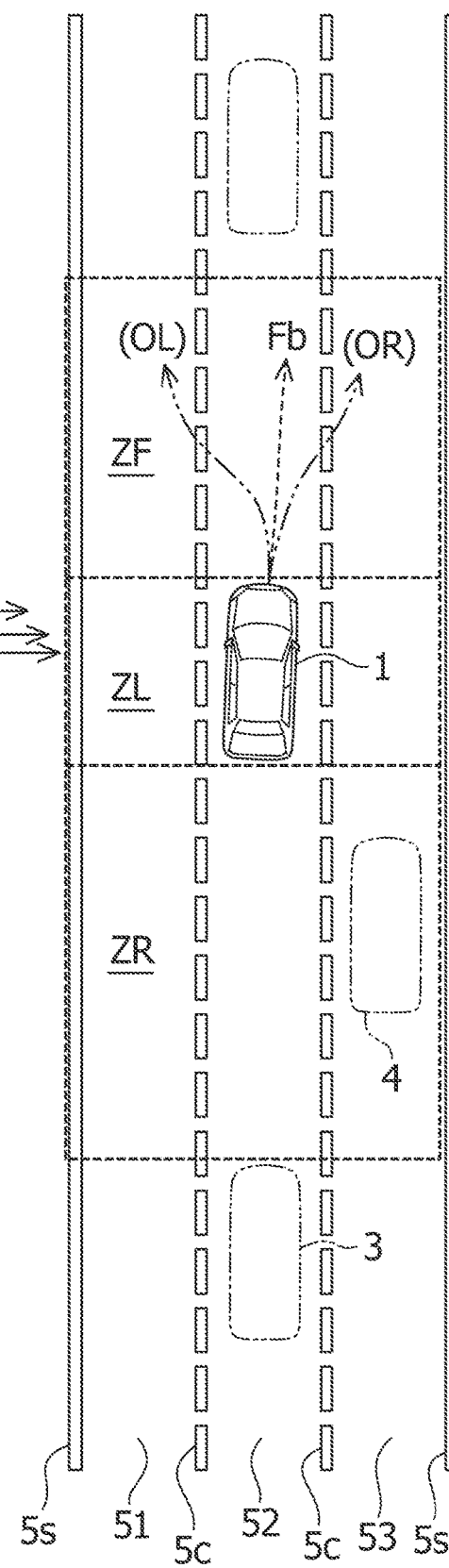

DRIVING CONTROL APPARATUS FOR VEHICLE

FIELD OF THE INVENTION

The present invention relates to a driving control apparatus for a vehicle, and more particularly, relates to an override function in a partially automated in-lane driving system.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" based on these techniques are being promoted.

Such a driving control system is only for the purpose of driving support and is different from completely automatic driving. A driver is required to place both hands on the steering wheel and keep track of the driving situation so as to be able to manually drive at any time, the driver needs to respond in accordance with the situation, and the driving control system has an override function that switches to manual driving by the driver's operation intervention even while the system is operating. Patent Literature 1 discloses a vehicle lateral movement control device that determines change speed (fallback speed) of a fallback control amount to shift to manual driving according to change speed of a steering operation amount input by a driver.

In JP 2012-096569A, if the change in speed of the steering operation amount is large, it is regarded as steering intervention intended by the driver and driving is shifted to manual driving in a short time, and if the change in speed of the steering operation amount is small, fallback control is performed relatively taking more time, and driving is shifted to manual driving. However, the large change in speed of the steering operation amount does not necessarily mean steering intervention intended by the driver, nor does fallback control corresponding to the change in speed of the steering operation amount necessarily mean control suitable for the movement state of the vehicle.

For example, in the partially automated in-lane driving system (PADS), an operational design domain (ODD) which is a condition allowing for execution of partially automated in-lane driving is defined by a designer's intention, and if a driving condition of the vehicle deviates from the ODD while a partially automated in-lane driving function is operating, ACC and LKA shift to a fallback control mode, the driver is notified of ACC and LKA function stop and an operation takeover request (takeover request), and ACC and LKAS fallback control is started after the elapse of several seconds.

When the driver is notified of the ACC and LKA function stop and the operation takeover request due to ODD deviation, it may be assumed that behavior of the vehicle becomes unstable due to LKA override by excessive steering operation and ACC override by excessive brake operation/accelerator operation of the driver who is overwhelmed by the notification.

For example, as shown in FIG. 6A, if a vehicle 1 receives a gust of wind from a lateral direction during partially automated in-lane driving and the LKAS becomes inoperable and deviates from the ODD, the driver is notified of the ACC and LKA function stop and the steering and braking/driving takeover request, and if the driver who is overwhelmed by the notification performs excessive brake operation (ACC brake override), deceleration may cause the behavior to become unstable as indicated by a reference sign OB in the figure and cause the vehicle to come close to a following vehicle 3. In addition, if the driver who is overwhelmed by the notification performs excessive accelerator operation (ACC accelerator override), acceleration may cause the vehicle to come close to a vehicle 2 ahead or deviate from the vehicle's lane as indicated by a reference sign OA in the figure.

Furthermore, as shown in FIG. 6B, if the driver who is overwhelmed by the above-described notification performs excessive right steering (LKA right steering override), steering may cause the vehicle to deviate to a right lane as indicated by a reference sign OR in the figure and, if there is a preceding vehicle 2 or following vehicle 4, cause the vehicle to come close to those. In addition, if the driver who is overwhelmed by the notification performs excessive left steering (LKA left steering override), steering may cause the behavior to become unstable or cause the vehicle to deviate to a left lane as indicated by a reference sign OL in the figure.

SUMMARY OF THE INVENTION

The present invention has been made in view of the above-described actual situation, and an object is to provide a driving control apparatus for a vehicle that prevents acceleration/deceleration and lane departure due to excessive operation intervention during a transition process to ACC and LKA fallback control at the time of system operational design domain deviation.

In order to solve the above-described problems, an embodiment of the present invention is directed to
  a driving control apparatus for a vehicle, including:
  an environmental condition estimating part including a surrounding recognition function for recognizing a vehicle's driving lane and other vehicles driving in the driving lane and a function for obtaining the vehicle's moving state;
  a path generating part for generating a target path on the basis of information obtained by the environmental condition estimating part; and
  a vehicle control part configured to perform speed control for keeping a preset target speed or target inter-vehicle distance with a preceding other vehicle and steering control for causing the vehicle to follow the target path, and having:
  an ACC function for performing constant speed cruise according to the target speed when there is no preceding other vehicle in the vehicle's driving lane and performing following cruise by maintaining the predetermined inter-vehicle distance when there is a preceding other vehicle;
  an LKA function for maintaining cruise in the vehicle's driving lane by following control to the target path;
  an override function for stopping the ACC function and the LKA function by a driver's operation intervention; and
  a function for performing fallback control of the ACC function and/or the LKA function, with notifying the driver of stopping the ACC function and/or the LKA function and operation takeover, at a time of system operational design domain deviation of the ACC function and/or the LKA function, characterized in that override threshold values of the functions serving as a determination criterion of the operation intervention for stopping the ACC function and/or the LKA function at the time of system operational design domain deviation are configured to be altered to a value greater than during normal operation when the functions are within a system operational design domain.

According to the driving control apparatus for the vehicle according to the present invention, because the override threshold value serving as the determination criterion of the operation intervention at the time of system operational design domain deviation of the ACC function and/or the LKA function is altered to a value greater than during normal operation when the functions are within the system operational design domain, if a driver who is overwhelmed by ACC and LKA function stop advance notice and operation takeover notice performs excessive operation intervention, override can be avoided, which enables shift to fallback control of the ACC function and the LKA function, can prevent acceleration/deceleration due to excessive operation intervention and lane deviation by steering, and is advantageous in smooth operation takeover.

BRIEF DESCRIPTION OF DRAWINGS

FIG. 6A is a schematic plan view exemplifying deceleration due to excessive brake override/acceleration due to excessive accelerator override, FIG. 6B is a schematic plan view exemplifying lane deviation due to excessive steering override at the time of ODD deviation.

FIG. 7A is a schematic plan view exemplifying prevention of excessive brake override/accelerator override, and FIG. 7B is a schematic plan view exemplifying prevention of excessive steering override at the time of ODD deviation.

DETAILED DESCRIPTION OF THE PREFERRED EMBODIMENTS

Hereinafter, an embodiment of the present invention will be described in detail with reference to the drawings.

Figure 1:
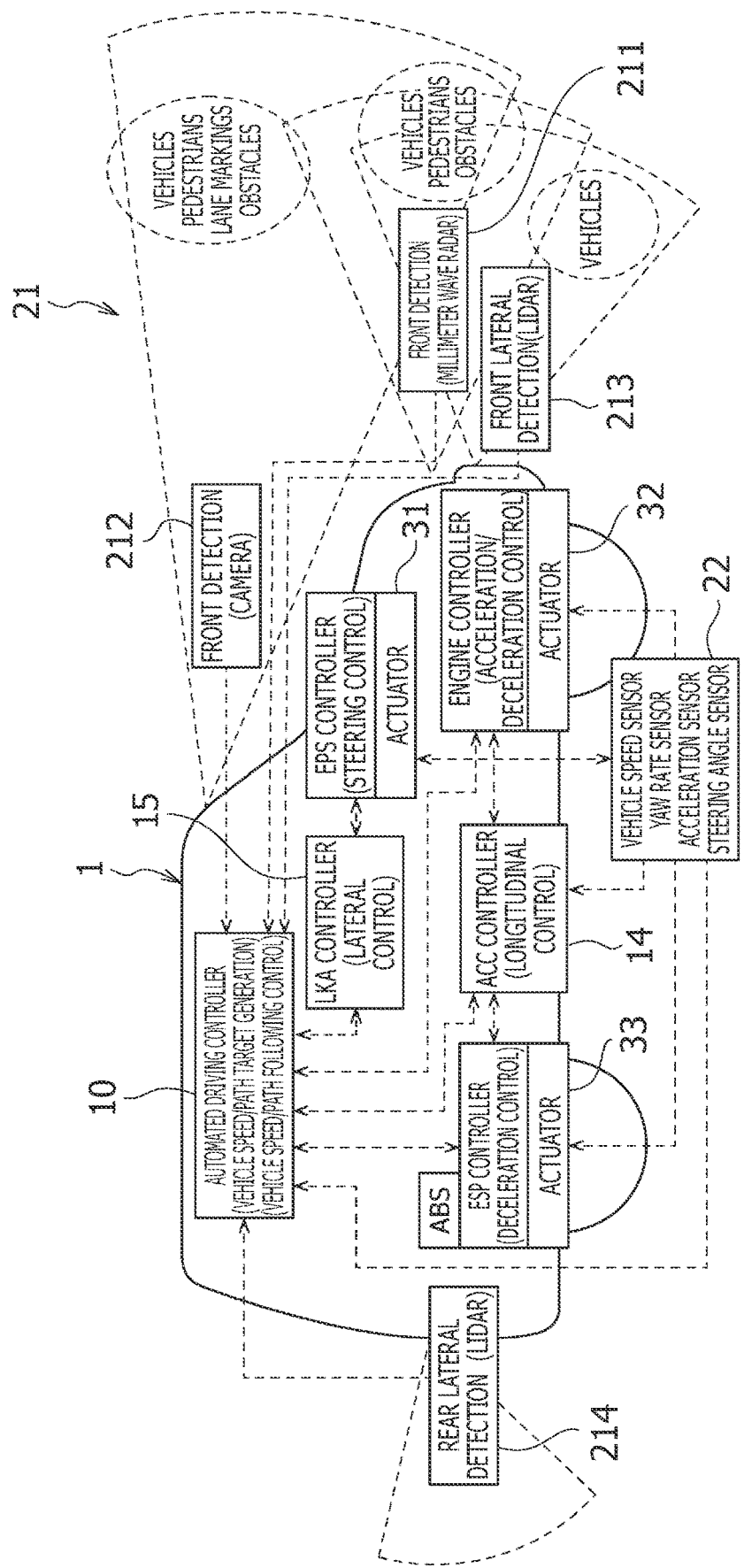
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them and performing path following control in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
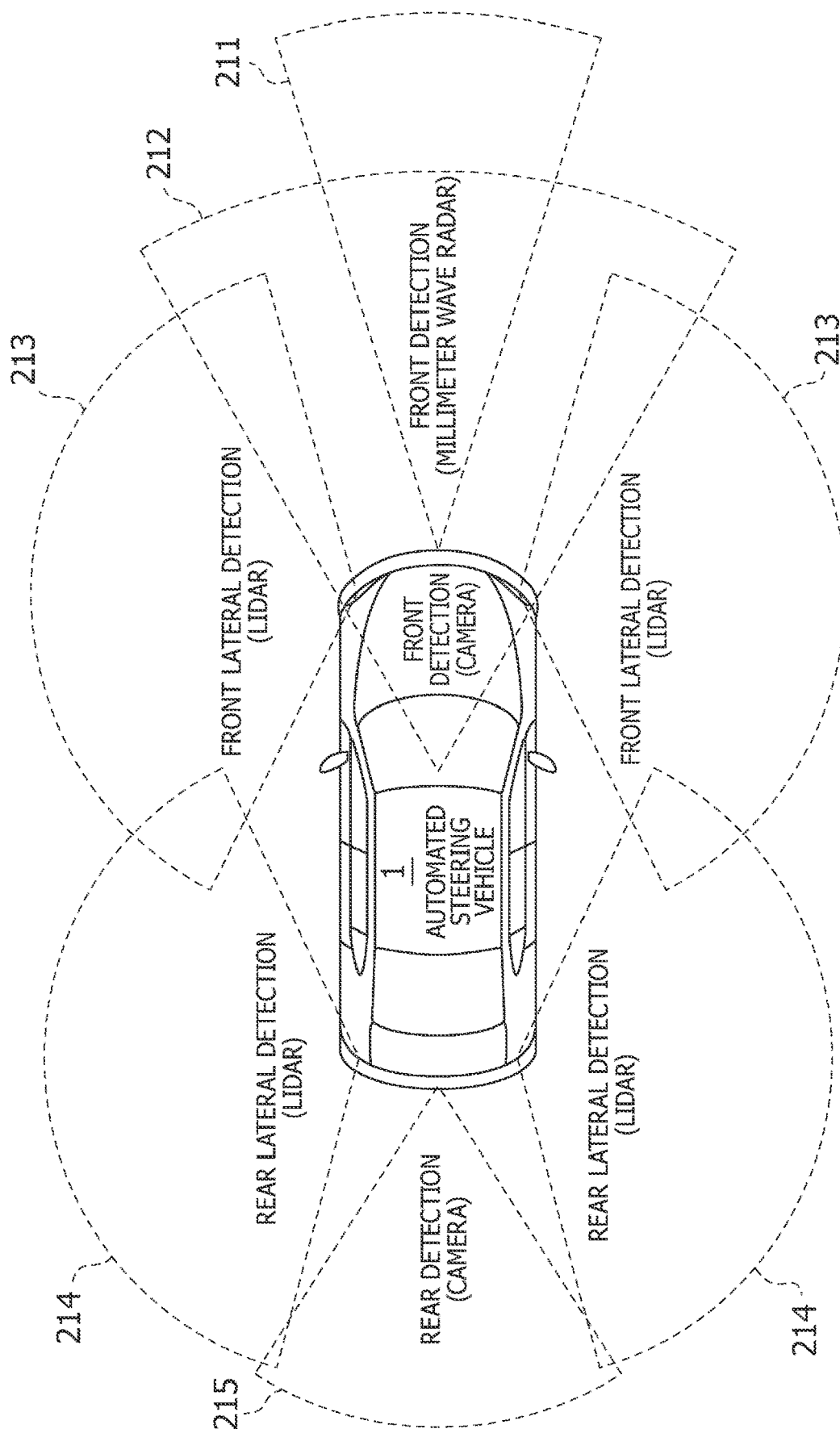
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions within a predetermined distance in the front, rear, left, and right directions of the vehicle.

Figure 3:
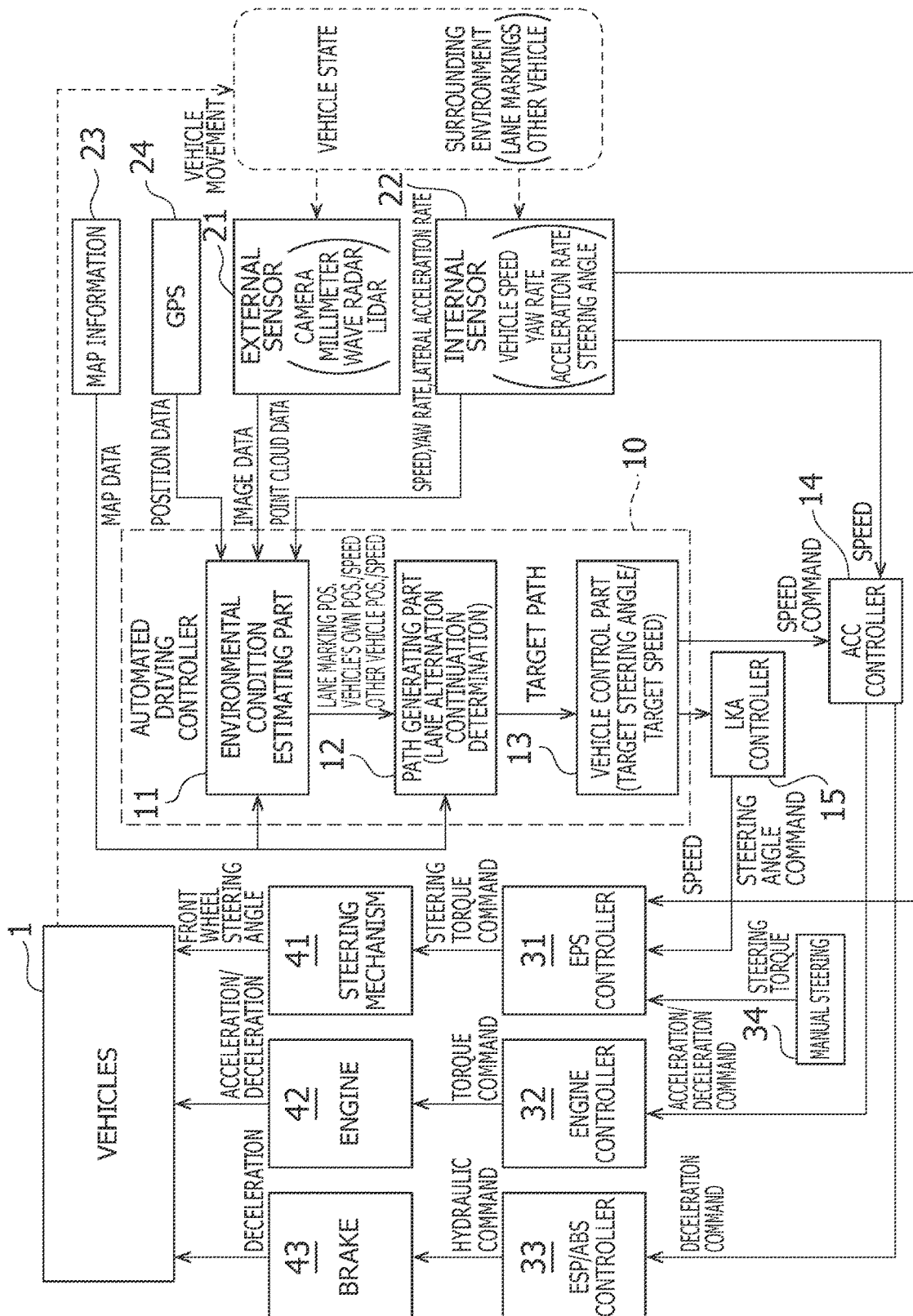
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by using positioning means 24 such as a GPS, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It refers to map information 23 and generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Outline of Partially Automated In-Lane Driving System

Next, an outline of a partially automated in-lane driving system (PADS) will be explained on the assumption of traveling within a single lane while following a vehicle ahead on a highway.

Partially automated in-lane driving (PADS driving) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after $\Delta t$ seconds from a relationship between a yaw rate $\gamma$ and lateral acceleration $(d^2y/dt^2)$ occurring due to vehicle movement by the vehicle's own position and movement characteristics of the vehicle itself, that is, a front wheel steering angle $\delta$ occurring when a steering torque T is applied to the steering mechanism 41 during traveling at a vehicle speed V, gives a steering angle command that makes the lateral displacement to "yt" after $\Delta t$ seconds to the EPS controller 31 via the LKA controller 15, and gives a speed command that makes the speed to "Vt" after $\Delta t$ seconds to the ACC controller 14.

During partially automated in-lane driving, the automated driving controller 10 recognizes a vehicle ahead in the lane and lane markings of the lane by the external sensor 21 and constantly monitors the vehicle itself to follow the generated target path. In particular, as shown in FIGS. 7A and 7B, future positions and speeds are predicted for other vehicles driving in a front area ZF, a rear area ZR, and a lateral area ZL configured according to the vehicle's speed.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) is operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33.

That is, in a case in which there is no vehicle ahead, the ACC function performs constant speed cruise by setting a cruise control set speed as the target speed; and in a case of having caught up with the vehicle ahead (in a case in which a speed of the vehicle ahead is slower than the cruise control set speed), the ACC function performs following cruise following the vehicle ahead while maintaining an inter-vehicle distance corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the LKA controller 15 and EPS controller 31 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

ODD Deviation Detection and Monitoring

In the partially automated in-lane driving system (PADS), a system operational design domain (ODD) which is a condition allowing for execution of partially automated in-lane driving is defined by a designer's intention. The operational design domain (ODD) includes the following.

Road conditions: highway (two or more lanes on one side, dashed-line lane markings, and main line curvature of 300 R or more), and general road (three or more lanes on one side, dashed-line lane markings, lane width of 3.25 m or more, and straight line);

Geographical conditions: other than urban areas and mountainous areas (geo fence);

Environmental conditions: weather (clear sky, cloudy, or no wind), and time zone (night restrictions);

Vehicle states: vehicle speed (within speed limit), longitudinal and lateral acceleration/deceleration (within acceleration/deceleration limits), within other system limits, and no system failure; and Driver states: no driver abnormality, no driver erroneous operation, and the like.

Conditions that should be particularly monitored among the above include suddenly changing environmental conditions like rainfall, snowfall, gusts and crosswinds, and a road surface change (wet and accumulation of snow), and they can be detected from image analysis or the like of the camera included in the front detection means 212 (for example, image analysis of the road surface for rainfall and snowfall, and image analysis of a streamer for crosswind), and it is also determined that ODD deviation has occurred when the ESP (vehicle behavior stabilization control system/skidding prevention device) is activated due to a road surface change or road side slope.

Furthermore, as a driving operation environment, it is determined that ODD deviation has occurred when hands-off time continuation (steering torque sensor), seat belt release (seat belt switch), wiper high-speed operation (wiper switch), door open (door switch), system off (system off switch), or gear position change (gear position switch) is detected.

During the operation of the partially automated in-lane driving function (PADS), the environmental condition estimating part 11 constantly monitors whether the driving state of the vehicle, road conditions, geographical conditions, environmental conditions, and the like are kept within the range of the ODD on the basis of the external information obtained through the external sensor 21, the vehicle information obtained by the internal sensor 22, the map information 23, and the positional information (absolute position of the vehicle itself) obtained by the positioning means 24, and if ODD deviation is detected, driving authority is delegated from the system to the driver, and driving is shifted from the partially automated in-lane driving to manual driving.

Override Function

During the operation of the partially automated in-lane driving function (PADS), both longitudinal control system (ACCS) and lateral control system (LKAS) can be overridden by the driver.

The longitudinal control system (ACCS) is overridden if an engine torque request by accelerator pedal operation of the driver or a deceleration request by brake pedal operation is equal to or greater than a corresponding override threshold value. These override threshold values are set to an accelerator operation amount (engine torque command value) or a brake operation amount (ESP hydraulic command value) based on which it is determined that the driver has intentionally performed acceleration/deceleration operation, and both are set according to the acceleration/deceleration characteristic and driving state of the vehicle.

That is, the ACC override stops ACC control if an operation amount or operation speed based on which it is determined that the driver has performed accelerator pedal operation or brake pedal operation with an intention of acceleration or deceleration with respect to the control vehicle speed is applied to the accelerator pedal or brake pedal, and shifts to driving by the driver's accelerator and brake operation.

The lateral control system (LKAS) is overridden if a steering torque by the driver's manual steering 34 is equal to or greater than the override threshold value. The override threshold value by the steering intervention is set according to the steering characteristic and driving state of the vehicle.

That is, the steering override stops LKA control if an operation amount or operation speed based on which it is determined that the driver has performed steering with an intention of additive steering (in the same direction) or subtractive steering (in the opposite direction) with respect to the control steering torque is applied to a steering system, and shifts to driving by the driver's manual steering.

Shift to ACC and LKA Fallback Control Mode at ODD Deviation

During the operation of the partially automated in-lane driving system (PADS), if ODD deviation due to, for example, generation of a gust is detected, the ACCS and LKAS shift to a fallback control mode. At this time, first the driver is notified of ACC and LKA function stop advance notice and an operation takeover request (takeover request), and ACC and LKA fallback control is started after the elapse of a prescribed waiting time (for example, four seconds).

The ACC fallback control gradually decreases an acceleration/deceleration command value (vehicle speed command) input into the engine controller 32 to 0 km/h/s with a predetermined inclination, and also gradually decreases a deceleration command value input into the ESP controller to 0 m/s$^2$ with a predetermined inclination.

The LKAS fallback control gradually decreases a steering torque command value (steering angle command) input into the EPS controller to 0 Nm with a predetermined inclination. When the LKAS and ACC fallback control ends, the steering operation and accelerator/brake operation are taken over by the driver.

As described above, when ODD deviation is detected during the operation of the partially automated in-lane driving function, the ACCS and LKAS shift to the fallback control mode; and at that time as already described above, by the driver who has been overwhelmed by the ACC and LKA function stop advance notice and takeover request notice, lane departure due to excessive steering intervention (LKA override) and acceleration/deceleration behavior due to excessive accelerator/brake operation intervention (ACC override) may occur.

Excessive Operation Prevention Function at ODD Deviation

The automated driving controller 10 according to the present invention has an excessive operation prevention function that, at the time of the ACC and LKA function stop and the takeover of steering and braking/driving by the driver when an event that deviates from the ODD is detected during the operation of the partially automated in-lane driving function, changes the ACC override threshold value and LKA override threshold value to a value greater than during normal operation in a period from the partially automated in-lane driving function stop (ACC and LKA function stop advance notice) to the ACC and LKA function stop (for example, elapse of four seconds after notification-ACC and LKA fallback control start-ACC and LKA fallback control end).

By increasing the ACC override threshold value and LKA override threshold value at the time of ODD deviation, an override state is avoided and the ACC and LKA control is continued, thereby acceleration/deceleration and steering are suppressed, and lane departure and the like can be avoided even if the driver who has been overwhelmed by the ACC and LKA function stop advance notice performs excessive accelerator/brake operation intervention or steering intervention and applies a large operation amount that would lead to acceleration/deceleration and lane departure before threshold value change.

1. ACC Override Threshold Value

First, an excessive operation prevention function by changing the ACC override threshold value will be described below. An excessive steering prevention function by changing the LKA override threshold value will be described later.

Accelerator Override Threshold Value within System ODD/during Normal Operation

If an engine torque command value by the driver's accelerator depression is greater than an engine torque command value for maintaining ACC set speed (cruise control set speed or vehicle ahead following speed) or ACC set acceleration, accelerator override is reached and the driver's accelerator operation is given priority. The threshold value is obtained from an engine torque map set according to a vehicle speed and gear position, and an engine torque command value that gives acceleration corresponding to, for example, a speed of 4 km/h, to the ACC set speed or an engine torque command value causing acceleration corresponding to 0.3 m/s² to the ACC set acceleration is set as a threshold value Td.

Brake Override Threshold Value within System ODD/During Normal Operation

If an ESP hydraulic command causing deceleration with respect to the ACC set speed (cruise control set speed or vehicle ahead following speed) or ACC set acceleration is given by the driver's brake depression, brake override is reached and the driver's brake operation is given priority. An ESP hydraulic command value that causes deceleration corresponding to, for example, a speed of 2 km/h with respect to the ACC set speed or an ESP hydraulic command value that causes deceleration corresponding to 0.2 m/s² with respect to the ACC set acceleration is set as a threshold value Pd.

Accelerator Override Threshold Value at ODD Deviation

A value greater than the ACC accelerator override threshold value during normal operation, preferably in the range of 120% to 250%, and more preferably in the range of 150% to 220% of the ACC accelerator override threshold value during normal operation is selected. For example, an engine torque command value that gives acceleration corresponding to a speed of 8 km/h with respect to the ACC set speed or an engine torque command value that causes acceleration corresponding to 0.6 m/s² with respect to the ACC set acceleration is set as a threshold value To.

Brake Override Threshold Value at ODD Deviation

A value greater than the ACC brake override threshold value during normal operation, preferably in the range of 120% to 250%, and more preferably in the range of 150% to 220% of the ACC brake override threshold value during normal operation is selected. For example, an ESP hydraulic command value that causes deceleration corresponding to a speed of 4 km/h with respect to the ACC set speed or an ESP hydraulic command value that causes deceleration corresponding to 0.4 m/s² with respect to the ACC set acceleration is set as a threshold value Po.

ACC Override Threshold Value Change Flow at ODD Deviation

Figure 4:
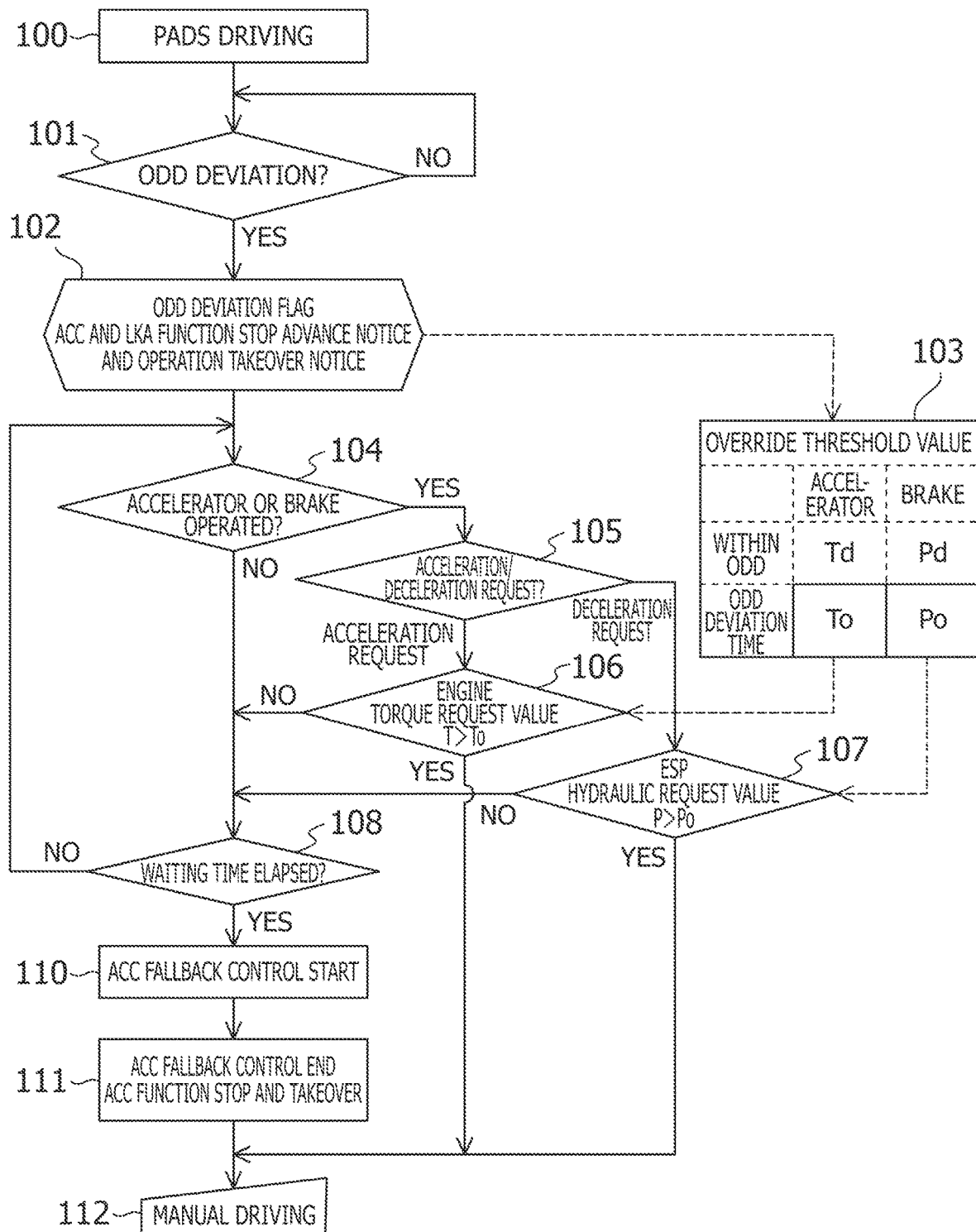
FIG. 4 is a flowchart showing excessive accelerator/brake override prevention control at a time of ODD deviation.

Next, a flow at the time of ODD Deviation will be described with reference to FIG. 4.

(1.1) Driving by Partially Automated In-Lane Driving System (PADS Driving)

When PADS driving is selected by the driver's operation, the ACCS and LKAS are activated after a system check, being PADS driving is displayed in a meter panel or the like (step 100). During PADS driving, the ACCS and LKAS work together, and perform constant speed cruise at the target speed (cruise control set speed) keeping within a single lane or perform following cruise maintaining a predetermined inter-vehicle distance. In this case, a target path within a lane is set to the center of lane markings, a predetermined offset distance from a left or right lane marking, or the like.

(1.2) ODD Deviation Determination

During PADS (ACCS and LKAS) driving, it is constantly monitored by the environmental condition estimating part 11 whether the surrounding environment and the state of the vehicle are within the ODD on the basis of the external information obtained through the external sensor 21, the vehicle information obtained by the internal sensor 22, the map information 23, and the positional information obtained by the positioning means 24 (step 101).

(1.3) ODD Deviation

During PADS (ACCS and LKAS) driving, if it is determined that ODD deviation has occurred based on, for example, receiving a gust from the lateral direction as shown in FIGS. 6A and 6B, activation of the ESP due to a road surface change, or hands-off time continuation detected by the steering torque sensor, an ODD deviation flag is set (step 102).

(1.4) ACC and LKA Function Stop Advance Notice and Operation Takeover Notice

At the same time, the driver is notified of ACC and LKA function stop advance notice and operation takeover due to ODD deviation by display in a head-up display or meter panel or voice. At the same time, counting of a waiting time (for example, four seconds) until shift to ACC and LKA fallback control is started.

(1.5) ACC Override Threshold Value Change

At the same time, the accelerator override threshold value Td and brake override threshold value Pd of the ACC within the system ODD/during normal operation are altered to the accelerator override threshold value To (To>Td) and brake override threshold value Po (Po>Pd) at the time of ODD deviation, respectively (step 103).

(1.6) Determination of Whether Accelerator and Brake Operation Is Performed

At this time point, the ACC is still operating, and whether accelerator operation or brake operation is performed by the driver is determined with position sensors attached to accelerator and brake pedals (step 104).

(1.7) Acceleration/Deceleration Request Determination

When the accelerator operation or brake operation by the driver is detected, it is determined whether the override by the driver is an acceleration request or a deceleration request (step 105).

(1.8) Accelerator Override Determination

In the case of the acceleration request, the engine torque command value by the driver's accelerator depression is compared with the override threshold value To (step 106). i) If the engine torque command value T>the override threshold value To, it is determined that the operation is accelerator override and the override is carried out immediately, shifting to manual driving. ii) If the engine torque command value T≤To, the override is not carried out, and ACC and LKA driving continues.

(1.9) Brake Override Determination

In the case of the deceleration request, the ESP hydraulic command value by the driver's brake depression is compared with the override threshold value Po (step 107). i) If the ESP hydraulic command value P>Po, it is determined that the operation is brake override and the override is carried out immediately, shifting to manual driving. ii) If the ESP hydraulic command value P≤Po, the override is not carried out, and ACC and LKA driving continues.

(1.10) Determination of Takeover Elapsed Time-ACC and LKA Fallback Control Start In the case of continuing ACC and LKA driving, counting of an elapsed time from the notification of the ACC and LKA takeover advance notice in the step 102 is continued (step 108), and ACC and LKA fallback control is started when the waiting time (four seconds) passes (step 110).

ACC fallback control: an acceleration/deceleration command value (vehicle speed command) input into the engine controller 32 is gradually decreased to 0 km/h/s with a predetermined inclination, and also a deceleration command value input into the ESP controller 33 is decreased to 0 m/s² with a predetermined inclination.

LKA fallback control: a steering torque command value input into the EPS controller is gradually decreased to 0 Nm with a predetermined inclination.

(1.11) ACC and LKA Fallback Control End-ACC and LKA Function Stop and Operation Takeover When the ACC and LKA fallback control ends, the ACC and LKA functions are stopped and operation takeover to the driver is performed (step 111), shifting to manual driving by the driver's accelerator/brake operation and steering (step 112).

2. LKA Override Threshold Value

The excessive steering prevention function by the LKA override threshold value change will be described below.

Steering Override Threshold Value within System ODD/during Normal Operation

For an additive steering override threshold value within the system ODD during normal operation, a steering torque (steering torque calculated from the vehicle speed-steering angle-steering torque map) corresponding to a steering angle by which a virtual lateral displacement "y't" for reaching a virtual lateral position after "t" seconds becomes "yt+α" is set as an additive steering override threshold value T1$d$, where "α" is a constant determined based on vehicle speed.

In the case of subtractive steering, a value that is perceptible (determined by the steering angle, steering angle speed, or the like) and is applied in a direction of reducing the steering torque to a value (steering torque target value) obtained by converting a steering angle by which a virtual lateral displacement "yt" for reaching a virtual lateral position after "t" seconds becomes "yt+α" into a steering torque is set as a subtractive steering override threshold value T2$d$, where "α" is a constant determined based on vehicle speed.

Steering Override Threshold Value at ODD Deviation

For an additive steering override threshold value, a value obtained by converting a steering angle calculated from virtual lateral displacement "y"t" (=yt+β, where β>α) at the time of ODD deviation and the movement characteristics of the vehicle with respect to the virtual lateral displacement "yt" within the system ODD/during normal operation into a steering torque is set as an additive steering override threshold value T1$o$.

For a subtractive steering override threshold value, a value obtained by converting a steering angle calculated from virtual lateral displacement "y"t" (=yt−γ, where "γ" is greater than a lateral displacement corresponding to a steering torque X' Nm) at the time of ODD deviation and the movement characteristic of the vehicle with respect to the virtual lateral displacement "yt" within the system ODD/during normal operation into a steering torque is set as a subtractive steering override threshold value T2$o$.

LKA Override Threshold Value Change Flow at ODD Deviation

Figure 5:
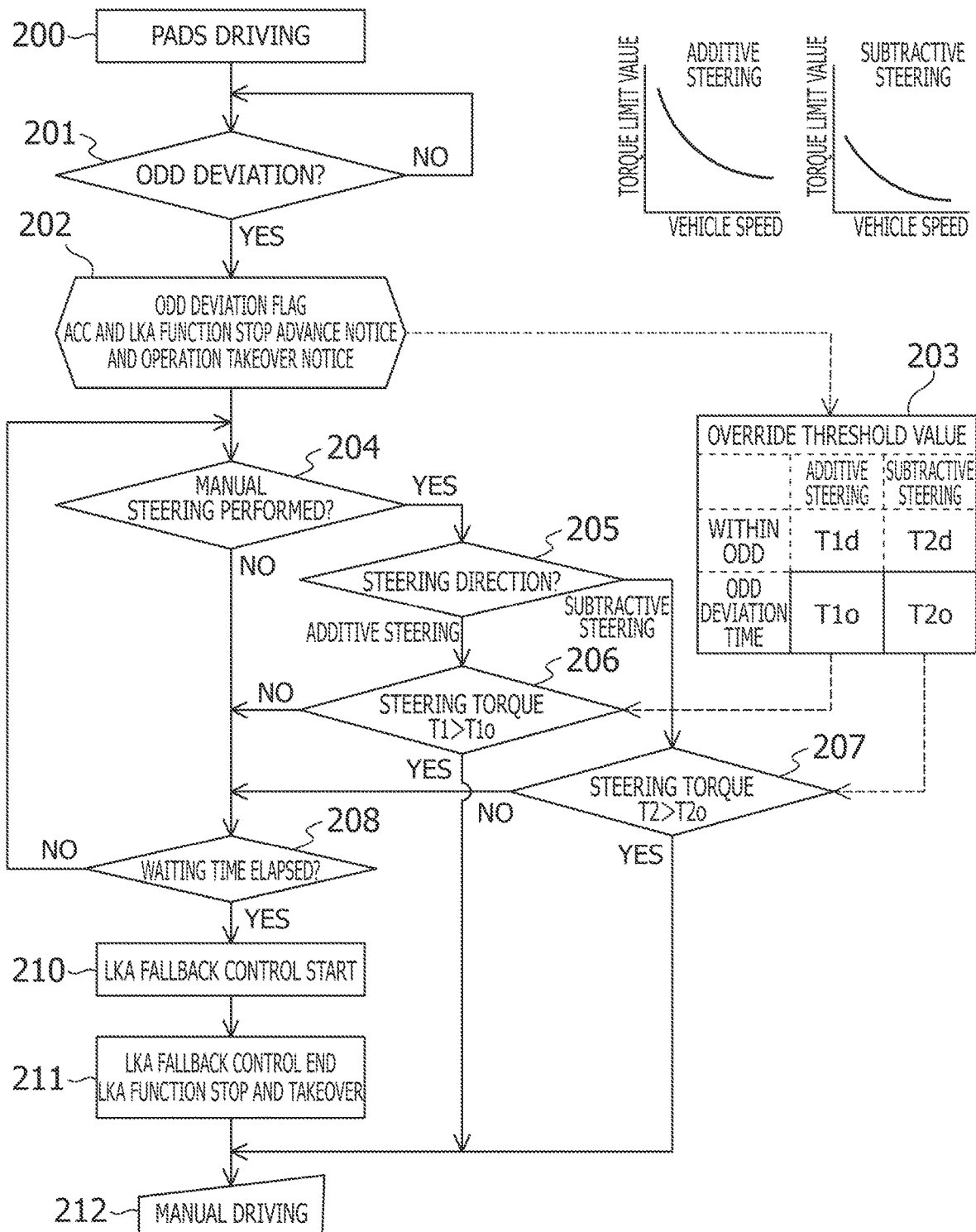
FIG. 5 is a flowchart showing excessive additive/subtractive steering override prevention control at the time of ODD deviation.

Next, an LKA override threshold value change flow at the time of ODD deviation will be described with reference to FIG. 5. A basic flow is the same as the excessive operation prevention function by the above-described ACC override threshold value change.

(2.1) Driving by Partially Automated In-Lane Driving System (PADS Driving)

When PADS driving is selected by the driver's operation, the ACCS and LKAS are activated after a system check, being PADS driving is displayed in the meter panel or the like (step 200). During PADS driving, the ACCS and LKAS work together, and perform constant speed cruise at the target speed (cruise control set speed) keeping within a single lane or perform following cruise maintaining the predetermined inter-vehicle distance. In this case, the target path within a lane is set to the center of the lane (driving lane), the predetermined offset distance from a left or right lane marking, or the like.

(2.2) ODD Deviation Determination

During PADS (ACCS and LKAS) driving, it is constantly monitored by the environmental condition estimating part 11 whether the surrounding environment and the state of the vehicle are within the ODD on the basis of the external information obtained through the external sensor 21, the vehicle information obtained by the internal sensor 22, the map information 23, and the positional information obtained by the positioning means 24 (step 201).

(2.3) ODD Deviation

During PADS (ACCS and LKAS) driving, if it is determined that ODD deviation has occurred based on, for example, receiving a gust from the lateral direction as shown in FIGS. 6A and 6B, activation of the ESP due to a road surface change, or hands-off time continuation detected by the steering torque sensor, an ODD deviation flag is set (step 202).

(2.4) ODD Deviation Notice, ACC and LKA Function Stop and Takeover Advance Notice At the same time, the driver is notified of occurrence of an event of ODD deviation, ACC and LKA function stop, and operation takeover advance notice by display in the head-up display or meter panel or voice. At the same time, counting of the waiting time (for example, four seconds) until shift to ACC and LKA fallback control is started.

(2.5) LKA Override Threshold Value Change

At the same time, the steering override threshold values (additive direction T1$d$ and subtractive direction T2$d$) within the system ODD/during normal operation are altered to the steering override threshold values (additive direction T1$o$ and subtractive direction T2$o$) at the time of ODD deviation (step 203).

That is, a value is calculated that is obtained by converting a steering angle calculated from lateral movement distance "yt" at this time point and the movement characteristics of the vehicle into a steering torque, and the steering override threshold values (additive direction T1$o$ and subtractive direction T2$o$) at the time of ODD deviation are set.

(2.6) Determination of Whether Manual Steering Is Performed

At the same time, whether manual steering 34 is performed is determined with a torque sensor attached to the EPS controller 31 (step 204).

(2.7) Steering Direction Determination

When it is determined that manual steering is performed from a detection value of the torque sensor attached to the EPS controller 31, a steering direction of the manual steering 34 is determined (step 205).

For the determination of the steering direction, it is determined to be additive steering if the torque is applied to the steering torque value calculated in the step 203 in a direction of increasing the steering torque, and it is determined to be subtractive steering if the torque is applied in a direction of decreasing the steering torque.

(2.8) Override Determination

It is determined whether the steering torque of the manual steering 34 exceeds the override threshold value.

(2.8-1) Additive Steering Override Determination

If the steering direction is determined to be additive steering in the steering direction determination, the steering torque is compared with the additive steering override threshold value T1$o$ (step 206).

i) If the steering torque>the additive steering override threshold value T1$o$, it is determined that the operation is override and the override is carried out immediately, shifting to manual driving.

ii) If the steering torque<the additive steering override threshold value T1$o$, the override is not carried out, and ACC and LKA driving continues.

(2.8-2) Subtractive Steering Override Determination

If the steering direction is determined to be subtractive steering in the steering direction determination, the steering torque is compared with the subtractive steering override threshold value T2$o$ (step 207). i) If the steering torque>the subtractive steering override threshold value T2$o$, it is determined that the operation is override, and the override is carried out immediately, shifting to manual driving. ii) If the steering torque<the subtractive steering override threshold value T2$o$, the override is not carried out, and ACC and LKA driving continues.

(2.9) Determination of Takeover Elapsed Time-ACC and LKA Fallback Control Start

In the case of continuing ACC and LKA driving, counting of an elapsed time from the notification of the ACC and LKA takeover advance notice in the step 202 is continued (step 208), and ACC and LKA fallback control is started after the waiting time (four seconds) passes (step 210).

ACC fallback control: the acceleration/deceleration command value (vehicle speed command) input into the engine controller 32 is gradually decreased to 0 km/h/s with the predetermined inclination, and also the deceleration command value input into the ESP controller 33 is decreased to 0 m/s$^2$ with the predetermined inclination.

LKA fallback control: the steering torque command value input into the EPS controller is gradually decreased to 0 Nm with the predetermined inclination.

(2.10) ACC and LKA Fallback Control End-ACC and LKA Function Stop and Operation Takeover When the ACC and LKA fallback control ends, the ACC and LKA functions are stopped and operation takeover to the driver is performed (step 211), shifting to manual driving by the driver's accelerator/brake operation and steering (step 212).

Although override by excessive steering at the time of ODD deviation can be basically prevented by the override threshold value change as described above, if the manual steering is equal to or greater than the override threshold value in the above-described override determination (steps 206 and 207), the LKA function will be overridden by the manual steering.

When the override threshold value at the time of ODD deviation is altered (step 203), by changing an upper limit value of the steering torque or steering angle (in inverse proportion to vehicle speed/decreases as vehicle speed increases) set according to vehicle speed by the EPS controller 31 to a value lower than during normal operation within the system ODD, excessive steering can be prevented when it is overridden by the manual steering.

When the override threshold value at the time of ODD deviation is altered (step 203), by changing a steering gain of the manual steering to a small value by the EPS controller 31, it is also possible to partially reflect the steering amount on the steering torque when it is overridden by the manual steering.

Operation and Effects

As detailed above, because the driving control apparatus for the vehicle according to the present invention is configured so that the override threshold values serving as a determination criterion of operation intervention to stop the ACC function and LKA function if an event that deviates from the ODD occurs during the operation of the partially automated in-lane driving system (PADS) are altered to a value greater than during normal operation within the system ODD.

Thanks to this configuration, as shown in FIG. 7A, even if the driver who is overwhelmed by the ACC and LKA function stop notice and the operation takeover notice performs excessive brake operation or accelerator operation, ACC override is avoided, which enables shift to fallback control (Fb) in the state of continuing the ACC and LKA functions, and can prevent acceleration (OA) or deceleration (OB) due to the excessive operation intervention, and accompanying approach to the other vehicles 3 and 4.

In addition, as shown in FIG. 7B, even if the driver who is overwhelmed by the ACC and LKA function stop notice and the operation takeover notice performs excessive steering operation, LKA override is avoided, which enables shift to fallback control (Fb) in the state of continuing the ACC and LKA functions, and can prevent right lane deviation (OR) or left lane deviation (OL) due to the excessive steering intervention, and accompanying approach to the other vehicle 4.

Because the override threshold values at the time of ODD deviation are kept from the ACC and LKA function stop advance notice and the operation takeover notice to end of the fallback control, operation takeover can be gradually performed in a state in which steering control by the LKA function and acceleration/deceleration control by the ACC function are partially active, smooth operation takeover can be performed, and in addition, because the override threshold value during normal operation is restored when ACC and LKA fallback control is finished and shift to manual driving is completed, and thereby, the state of being capable of override by operation intervention during normal operation is immediately reached when the system is returned to within the ODD.

In the above-described embodiment, the ACC override threshold value change and the LKA override threshold value change are shown in separate flowcharts (FIG. 4 and FIG. 5), but these can be integrated and described as one flow, and in that case, the step 104 and step 204 may be integrated to make three branches or the step 204 can be described before or after the step 104.

Although the embodiment is operable even in a form in which only one of the ACC override threshold value change and LKA override threshold value change is applied, a form in which only one of the accelerator override threshold value and brake override threshold value is applied, or a form in which only one of the additive steering override threshold value and subtractive steering override threshold value is applied, it is preferable to carry out all the threshold value changes concurrently as described above.

Although the embodiment has described in the case in which the accelerator override threshold value is set based on the engine torque request by the driver's accelerator pedal operation, the accelerator override threshold value can also be configured to be set based on the driver's accelerator pedal depression, that is, an accelerator pedal position.

In the same manner, although the embodiment has been described the case in which the brake override threshold value is set based on the deceleration request by the driver's brake pedal operation, the brake override threshold value can also be configured to be set based on the driver's brake pedal depression, that is, a brake pedal position.

Although the embodiment has exemplified the case in which the steering override threshold value is set based on the steering torque, the steering override threshold value can also be configured to be set based on the steering angle, steering angle speed, or the like.

Although some embodiments of the present invention have been described above, the present invention is not limited to the embodiments, various modifications and changes are possible within the scope of the present invention.

What is claimed is:

1. A driving control apparatus for a vehicle, comprising:
an environmental condition estimating part including a surrounding recognition function for recognizing a vehicle's driving lane and other vehicles driving in the driving lane and a function for obtaining the vehicle's moving state;
a path generating part for generating a target path on the basis of information obtained by the environmental condition estimating part; and
a vehicle control part configured to perform speed control for keeping a preset target speed or target inter-vehicle distance with a preceding other vehicle and steering control for causing the vehicle to follow the target path, and having:
an ACC function for performing constant speed cruise according to the target speed when there is no preceding other vehicle in the vehicle's driving lane and performing following cruise by maintaining the predetermined inter-vehicle distance when there is a preceding other vehicle;
an LKA function for maintaining cruise in the vehicle's driving lane by following control to the target path;
an override function for stopping the ACC function and the LKA function by a driver's operation intervention equal to or greater than override threshold values;
a function for monitoring whether the surrounding environment and the state of the vehicle are maintained within a system operational design domain for performing the ACC function and the LKA function on the basis of information obtained by the environmental condition estimating part; and
a function for performing fallback control of the ACC function and/or the LKA function, with notifying the driver of stopping the ACC function and/or the LKA function and operation takeover when the deviation of the surrounding environment or the state of the vehicle to perform the ACC function and/or the LKA function from the system operational design domain is detected,
wherein when the deviation from the system operational design domain is detected, the override threshold values serving as a determination criterion of the operation intervention for stopping the ACC function and/or the LKA function are set to second values greater than the first values during normal operation when the surrounding environment and the state of the vehicle are maintained within the system operational design domain.

2. The driving control apparatus for the vehicle according to claim 1, wherein the system operational design domain deviation is determined on the basis that a vehicle state obtained by the environmental condition estimating part, an environmental condition including a road surface change obtained by the environmental condition estimating part using the surrounding recognition function, or a road condition obtained by the environmental condition estimating part using map information and positioning means, deviates from the system operational design domain.

3. The driving control apparatus for the vehicle according to claim 1, wherein the system operational design domain deviation is determined based on detecting at least one of driving operation environmental conditions including hands-off time continuation, seat belt release, wiper high-speed operation, door opening, system off, and gear position change.

4. The driving control apparatus for the vehicle according to claim 1, wherein the override threshold values include ACC override threshold values composed of an accelerator override threshold value serving as a determination criterion of accelerator operation intervention and/or a brake override threshold value serving as a determination criterion of brake operation intervention.

5. The driving control apparatus for the vehicle according to claim 1, wherein the override threshold values include LKA override threshold values composed of an additive steering override threshold value and/or a subtractive steering override threshold value serving as a determination criterion of steering operation intervention.

6. The driving control apparatus for the vehicle according to claim 1, wherein the second override threshold values are maintained from the notification of stopping the ACC function and the LKA function and operation takeover to end of the fallback control, and when the fallback control is finished, the override threshold values are set back to the first values.

* * * * *